(12) United States Patent
Paul

(10) Patent No.: US 7,570,505 B2
(45) Date of Patent: Aug. 4, 2009

(54) MEMORY BASED COMPUTATION SYSTEMS AND METHODS FOR HIGH PERFORMANCE AND/OR FAST OPERATIONS

(75) Inventor: Bipul C. Paul, Sunnyvale, CA (US)

(73) Assignee: Toshiba America Research, Inc., Piscataway, NJ (US)

( * ) Notice: Subject to any disclaimer, the term of this patent is extended or adjusted under 35 U.S.C. 154(b) by 401 days.

(21) Appl. No.: 11/277,299

(22) Filed: Mar. 23, 2006

(65) Prior Publication Data

US 2007/0244947 A1 Oct. 18, 2007

(51) Int. Cl.
*G11C 17/00* (2006.01)
(52) U.S. Cl. .................. 365/94; 365/129; 365/230.01; 365/238.5
(58) Field of Classification Search .................. 365/94, 365/129, 230.01, 238.5; 711/169
See application file for complete search history.

(56) References Cited

U.S. PATENT DOCUMENTS

| | | | |
|---|---|---|---|
| 5,245,562 | A | 9/1993 | Dettmer |
| 5,274,581 | A | 12/1993 | Cliff et al. |
| 5,359,548 | A | 10/1994 | Yoshizawa et al. |
| 5,481,486 | A | 1/1996 | Cliff et al. |
| 5,544,115 | A * | 8/1996 | Ikeda ........................ 365/207 |
| 5,570,039 | A | 10/1996 | Oswald et al. |
| RE35,977 | E | 12/1998 | Cliff et al. |
| 5,926,036 | A | 7/1999 | Cliff et al. |
| 6,349,374 | B1 * | 2/2002 | Jin ............................ 711/169 |
| 6,359,466 | B1 | 3/2002 | Sharpe-Geisler |
| 2007/0129924 | A1 * | 6/2007 | Verheyen et al. .............. 703/14 |

OTHER PUBLICATIONS

Kaeriyame, Shunichi et al., NonVolatile Programmable Solid-Electrolyte Nanometer Switch, I.E.E.E. Journal of Solid-State Circuits, vol. 40, No. 1, Jan. 2005.
Abu-Khater, Issam et al., j) Circuit Techniques for CMOS Low-Power High-Performance Multipliers, I.E.E.E., Journal of Solid-State Circuits, vol. 31, No. 10, Oct. 1996.
Kim, Myung-Soon et al, k) Look-Up Table-Based Pulse Shaping Filter Design, I.E.E.E., Electronics Letters, vol. 36, No. 17, Aug. 17, 2000, 2 pages (1505-1506).
Fonseca, M. et al., Design of a Radix-2-Hybrid Array Multiplier Using Carry Save Adder, SBCCI, Proceedings of the 18th annual symposium on Integrated circuits and system design, Florianolpolis, Brazil, Session: Low power digital circuits design, 2005, ISBN:1-59593-174-0, pp. 172-177.
Rafiquzzaman, M. and Chandra, R., "Modern Computer Architecture," published by West Publishing Co., 1988, pp. 94-100.
Fonseca, M. et al., Design of a Radix-2-Hybrid Array Multiplier Using Carry Save Adder, SBCCI, Proceedings of the 18th annual symposium on Integrated circuits and system design, Florianolpolis, Brazil, Session: Low power digital circuits design, 2005, ISBN:1-59593-174-0, pp. 172-177, Sep. 4, 2005.

(Continued)

*Primary Examiner*—Pho M. Luu
(74) *Attorney, Agent, or Firm*—Watchstone P+D, pllc; Stephen B. Parker

(57) ABSTRACT

A high performance logic circuit optimizes a digital logic function by dividing the function into smaller blocks. Thus, the logic circuit is divided into smaller blocks. The smaller blocks are implemented with read-only memory (ROM), in which outputs corresponding to input combination are pre-stored. Inputs to each of the smaller blocks are used as an address to access the ROM.

15 Claims, 15 Drawing Sheets

OTHER PUBLICATIONS

Orginos, I. et al., A Novel Algorithm for Multi-Operand Logarithmic Number System Addition and Subtraction Using Polynomial Applications, I.E.E.E., in Proceedings of IEEE International Symposium on Circuits and Systems, (ISCAS'95), vol. 3, pp. 1992-1995, Seattle, 1995.

XILINK Adder/Subtractor v7.0 Product Specification, DS214 Apr. 28, 2005, pp. 1-6.

Chapman, Ken, Fast Integer Multipliers, pp. 28-31, Mar. 1993.

Raju, Murigavel, Digital FIR Filter Design Using the MSP430F16x, Texas Instruments Application Report SLAA228-Nov. 2004, pp. 1-5.

* cited by examiner

Addition of $i^{th}$ bit of numbers X, Y and Z

MEMORY BASED COMPUTATION SYSTEMS AND METHODS FOR HIGH PERFORMANCE AND/OR FAST OPERATIONS

BACKGROUND

1. Field of the Invention

The present application relates to, e.g., computation systems and methods and, in some preferred embodiments, to novel memory based computations systems and methods for high performance and/or fast operations logic circuits.

2. Background Discussion

A variety of high performance logic circuits are known. Exemplary circuits include, e.g., Adders, Multipliers, Fast Fourier Transform (FFT) Compilers, Finite Impulse Response (FIR filters), etc.

By way of example, in common digital signal processor (DSP) devices, a multiplication unit is used to implement algorithms, such as, by way of example, filtering, etc. Often, a digital multiplier has a substantial impact on the performance. With the increasing demands for, among other things, high-performance portable systems with, e.g., multimedia capabilities, low power design requirements are also of increased importance. Digital multipliers are used in variety of system applications, such as, e.g., digital filters, correlators and neural networks, as well as in a variety of other applications. As just one other illustrative example, digital finite impulse response (FIR) filters often form a basis for many digital signal processing system applications.

As described below, in certain applications unrelated to high performance applications, ROM (Read only Memory) based design has been employed. In this regard, ROM based design has been employed in Field Programmable Gate Array (FPGA) architecture, where basic gates like NAND, NOR, etc., have been implemented following this ROM based design approach. In addition, a similar approach has also been used to generate series functions like logarithmic numbers and sinusoidal functions. However, such known applications are slow and consume a considerable amount of energy. One major reason for slower operation and higher energy consumption in such ROM based design in FPGA architecture is the use this approach for achieving reconfigurability. For this purpose, mainly basic gates are implemented using very small ROM structures (typically, 4 to 16 bit), which requires an increased number of transistors as compared to a conventional CMOS gate.

By way of example, FIG. 2 depicts an existing look-up-table-based configuration logic cell. In particular, the circuit shown in FIG. 2 has a two input gate, whose functions can be defined by appropriately writing the memory cells SW0 to SW3. Accordingly, by changing the memory content, the function can be accordingly changed. In the figure, input A and input B are two inputs that are used to access one of the four memory cells SW0 to SW3 for the right output.

However, implementing small functions like NAND or NOR using this technique, as in the case of FPGA, results in a slower operation and a higher power operation than with a conventional logic gate alone, as well as a larger area. This is because a two input NAND gate (see, e.g., FIG. 3), by way of example, requires only four transistors in CMOS design, which is fast and consumes less power.

Similarly, in the context of implementing series functions using this approach, this typically involves the employment of a large ROM size, which results in large delays (e.g., accessing the memory), increased area usage, and increased power usage.

As set forth above, the existing ROM designs do not relate to high-activity, high performance applications. There remains a continued need for improvements in high performance logic circuits, including, for example, Adders, Multipliers, Fast Fourier Transform (FFT) Compilers, Finite Impulse Response (FIR filters), etc. —to name a few.

BACKGROUND PATENTS AND REFERENCES

The entire disclosures of each of the following background patents and references are incorporated herein by reference in their entireties:

a) U.S. Pat. No. 6,359,466, entitled Circuitry to Provide Fast Carry;

b) U.S. Pat. No. 5,926,036, entitled Programmable Logic Array Circuits Comprising Look Up Table Implementations of Fast Carry Adders and Counters;

c) U.S. Pat. No. RE35,977, entitled Look Up Table Implementation of Fast Carry Arithmetic and Exclusive-Or Operations;

d) U.S. Pat. No. 5,570,039, entitled Programmable Function Unit as Parallel Multiplier Cell;

e) U.S. Pat. No. 5,481,486, entitled Look Up Table Implementation of Fast Carry Arithmetic and Exclusive-OR Operations;

f) U.S. Pat. No. 5,359,548, entitled Floating-Point Arithmetic System Having Multiple-input Addition and Subtraction Means;

g) U.S. Pat. No. 5,274,581, entitled Look-up Table Implementation of Fast Carry for Adders and Counters;

h) U.S. Pat. No. 5,245,562, entitled Accumulating Arithmetic Memory Integrated Circuit;

i) *A NonVolatile Programmable Solid-Electrolyte Nanometer Switch*, Shunichi Kaeriyame, et al., I.E.E.E. Journal of Solid-State Circuits, Vol. 40, No. 1, January, 2005;

j) *Circuit Techniques for CMOS Low-Power High-Performance Multipliers*, Issam Abu-Khater, et al., I.E.E.E., Journal of Solid-State Circuits, Vol. 31, No. 10, October 1996;

k) *Look-Up Table-Based Pulse Shaping Filter Design*, Myung-Soon Kim, et al., I.E.E.E., Electronics Letters, Vol. 36, No. 17, Aug. 17, 2000;

l) *Design of a Radix-2-Hybrid Array Multiplier Using Carry Save Adder*, M. Fonseca, et al., SBCCI, Proceedings of the 18th annual symposium on Integrated circuits and system design, Florianolpolis, Brazil, SESSION: Low power digital circuits design, Pages: 172-177, 2005, ISBN:1-59593-174-0;

m) A Novel Algorithm for Multi-Operand Logarithmic Number System Addition and Subtraction Using Polynomial Applications, I. Orginos, et al., I.E.E.E., in Proceedings of IEEE International Symposium on Circuits and Systems, (IS-CAS'95), Vol. 3, pp. 1992-1995, Seattle, 1995.

SUMMARY

The preferred embodiments of the present invention can significantly improve upon existing methods and/or apparatuses.

According to some preferred embodiments, a system having a high performance logic circuit is provided that includes: a high performance logic circuit divided into smaller blocks; each of the smaller blocks being implemented with Read Only Memory in which outputs corresponding to input combinations are pre-stored; and inputs to each of the respective smaller blocks being used as a respective address to access a respective Read Only Memory. According to some examples, the blocks are optimally sized large enough to inhibit slower performance and small enough to inhibit larger delay and power requirements. In some examples, the circuit implements high activity large digital functions involving large memory sizes, and the storage requirement increases exponentially with a number of inputs. In other examples, the memory size is defined by $2^N \times O$, where N is the number of inputs and O is the number of outputs. In other examples, a logic depth is large enough to exploit ROM based design for high performance applications. In yet other examples, the high performance logic circuit relates to an adder, a multiplier, an FFT compiler, an FIR filter and/or the like. In some examples, the system further includes a decoder circuit and memory architecture for each of the smaller blocks.

According to some other embodiments, a method for providing a logic circuit for high performance and low power operations is provided that includes: dividing a large circuit block into optimum smaller blocks; implementing each of the smaller blocks using an Memory Based Computation (MBC) technique in which input bits are used as addresses to read results from memory. In some examples, the method further includes using input bits as addresses to access the memory of respective ones of the smaller blocks. In some examples, the method further includes optimizing the size of each of the smaller blocks so as to limit delay, to improve performance and/or to improve area requirements. In other examples, the method further includes reducing area overhead through ROM and/or three-dimensional (3D) architecture. In other examples, the logic circuit relates to a multiplier, and the method further includes selecting adder lengths to limit delay, improve performance and/or to improve area requirements. In yet some other examples, the method further includes providing a decoder circuit and memory architecture to implement each of the smaller blocks. In yet some other examples, the method further includes employing pipeline architecture with the MBC technique. In other examples, the method further includes employing pipeline architecture for resource management. In other examples, the method further includes using a same memory to obtain results for a plurality of different ones of the smaller blocks using pipelining. In other examples, the method further includes employing the method in three-dimensional circuit design. In some other examples, the method further includes implementing the memory in a layer close to a decoder and other circuit blocks.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which:

FIGS. 6(a)-6(c) demonstrate an illustrative and non-limiting example in the context of implementing a Carry Select Adder (CSA), wherein: FIG. 6(a) depicts a block diagram of a Carry Select Adder; FIG. 6(b) depicts a conventional logic implementation of the Carry Select Adder shown in FIG. 6(a); and FIG. 6(c) shows the implementation of each block using a Memory Based Computation (MBC) technique.

DETAILED DESCRIPTION

While the present invention may be embodied in many different forms, a number of illustrative embodiments are described herein with the understanding that the present disclosure is to be considered as providing examples of the principles of the invention and that such examples are not intended to limit the invention to preferred embodiments described herein and/or illustrated herein.

Introduction:

The preferred embodiments of the present invention can be employed within high performance logic circuits. In some examples, preferred embodiments can be employed within Adders, Multipliers, Fast Fourier Transform (FFT) Compilers, Finite Impulse Response (FIR filters), etc. In this disclosure, high performance logic circuits can include, in some embodiments, circuits that perform two or more logical operations, and, in some other embodiments, circuits that perform three or more logical operations, and, in some preferred embodiments, circuits that perform five or more logical operations, and, in some preferred embodiments, circuits that perform ten or more logical operations. Moreover, in this disclosure, high performance logic circuits can include, in some embodiments, circuits that have a logic depth of two or more, and, in some other embodiments, circuits that have a logic depth of three or more, and, in some preferred embodiments, circuits that have a logic depth of five or more, and, in some preferred embodiments, circuits that have a logic depth of ten or more.

Figure 1:
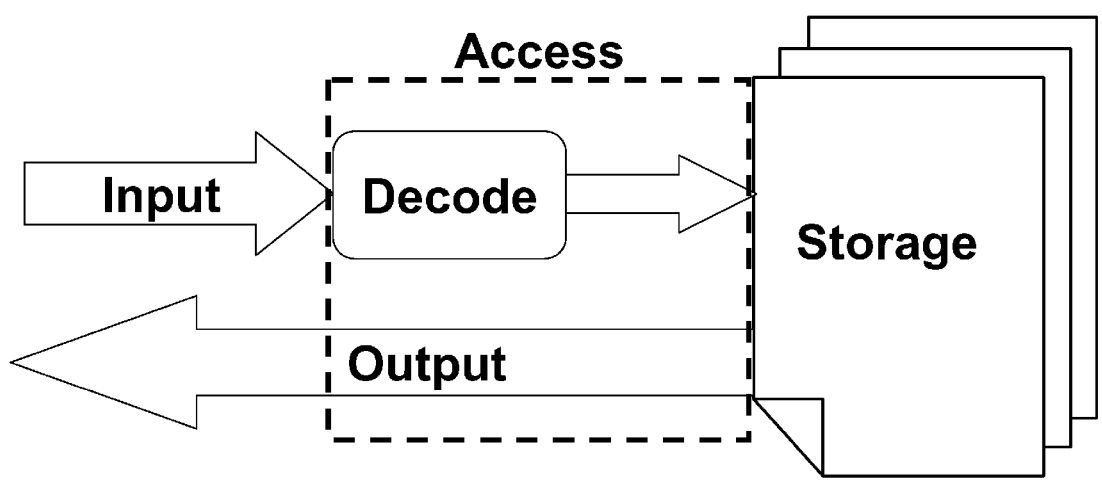
FIG. 1 is an architectural diagram depicting an illustrative embodiment according to the present invention.

In some preferred embodiments, a technique is provided which optimally divides a given circuit into smaller blocks, and which implements each block using ROM (Read Only Memory). In the preferred embodiments, inputs to each block is used as the address to access the ROM, where functional outputs for all input combinations are stored. For reference, FIG. 1 is an architectural diagram depicting an illustrative embodiment.

In the establishment of preferred embodiments, the size of each block is preferably selected to ensure that desired results are achieved. In this regard, such a selection preferably takes into account that: a) if block size is too small, a slower performance can be incurred than with, e.g., a regular logic; and b) if block size is too large, exceptionally large memory resources are required, resulting in larger delay and power requirements.

Illustrative Benefits:

According to some of the preferred embodiments, one or more, in some examples all, of the following benefits can be achieved: a) high performance; b) low power consumption; c) compact size (e.g., a product can be readily made into a compact size due to, e.g., its regular structure); d) robustness (e.g., a product can be readily made fault tolerant utilizing such regularity); and e) easiness to pipeline (e.g., which can result in even faster performance, and improved resource management). Note: a pipeline is generally analogous to a manufacturing assembly line, wherein an end goal is to increase productivity by, e.g., dividing a complex operation into pieces that can be performed in parallel.

In some preferred embodiments, one or more of the following specific advantages are achieved:

(1) By properly optimizing a circuit block and implementing the circuit block using ROM based design, this can result in higher performance and lower power than conventional CMOS logic;

(2) Pipelining can be readily employed that is substantially easier in many functions, such as, e.g., with respect to a multiplier;

(3) Resource management can be readily employed to, for example, save area when pipelined;

(4) A system can be implemented that facilitates continued development of high performance design, even with emerging devices and memories (e.g., even with two terminal devices and/or the like).

ILLUSTRATIVE EXAMPLES

In some preferred embodiments, memorizing the output of a function for all possible input combinations is an alternative way to implement a logic function—i.e., Memory Based Computation (MBC). In such an approach, instead of evaluating a logic function in real time, the output is preferably read from the memory where all possible outputs are pre-stored.

In this regard, as discussed above, existing MBC approaches had been limited to, e.g., use in FPGA (Field Programmable Gate Array) architectures to implement basic gates like NAND and NORs, etc., as well as to generate series functions like logarithmic numbers and sinusoidal functions. However, implementing high activity large digital functions (such as, e.g., adders, multipliers, etc.) for state-of-the-art high performance computations had not been previously contemplated or explored. Notably, because a large memory size (e.g., $2^N \times O$, where N is the number of inputs, and O is the number of outputs) is required to implement large functions using this approach, a straight forward implementation of such functions is not feasible.

Figure 2:
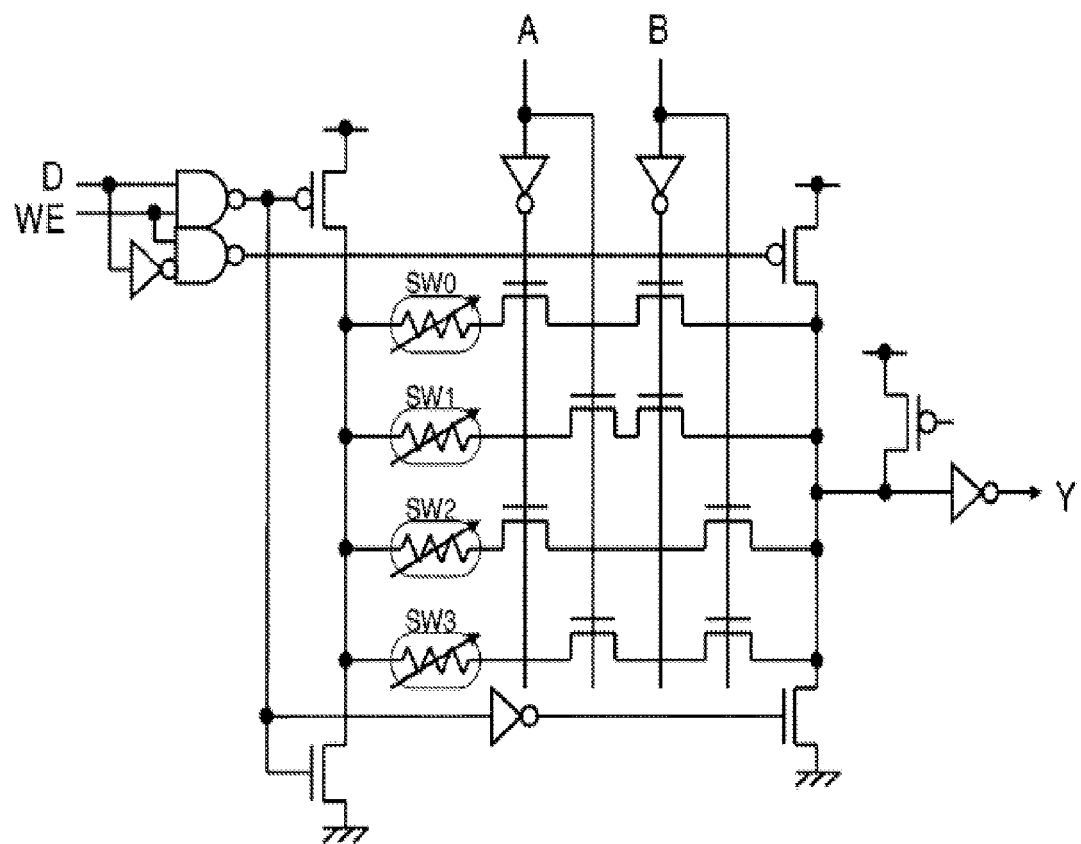
FIG. 2 shows an illustrative existing look-up-table-based configuration logic cell.
Figure 3:
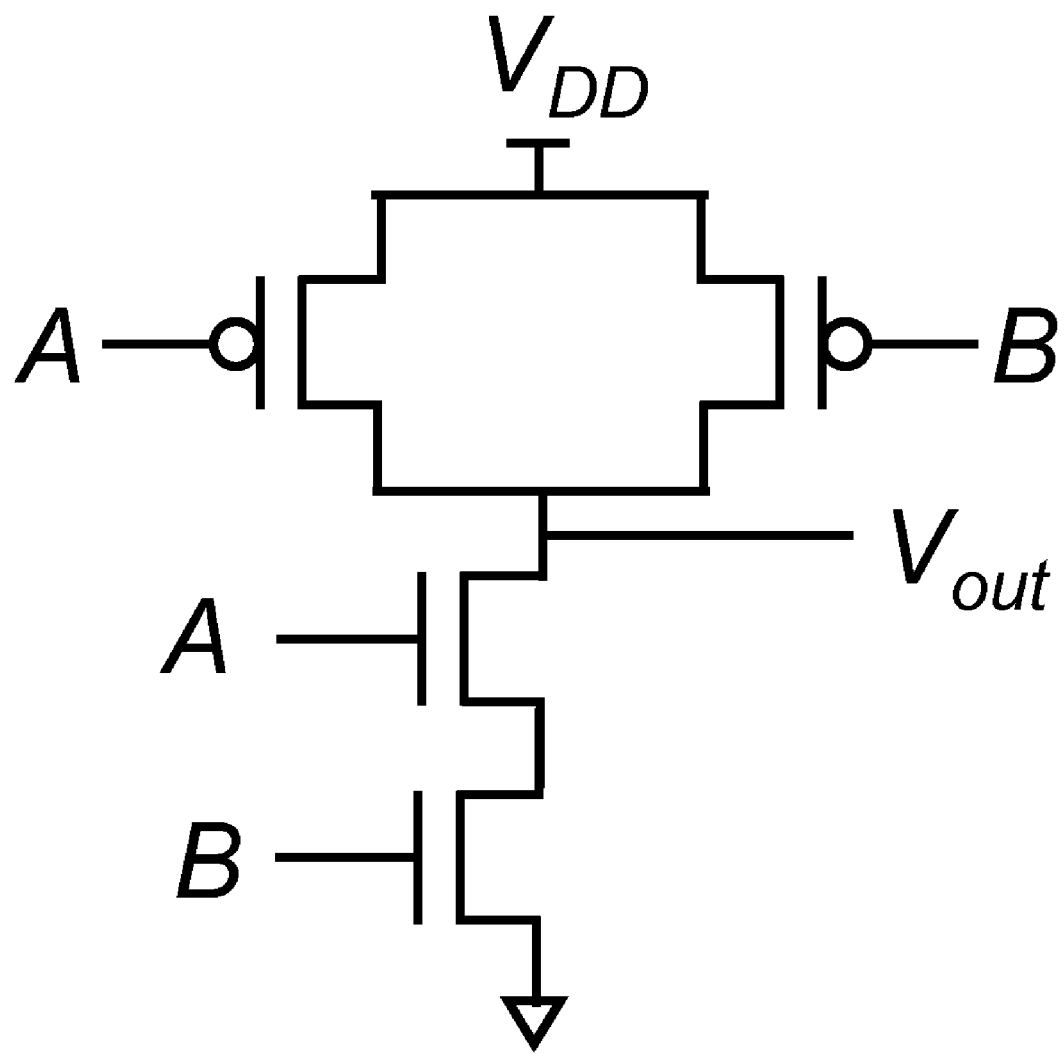
FIG. 3 shows an illustrative existing two input NAND gate.

Furthermore, designing high activity large digital functions using ROM based basic gates (such as, e.g., FPGA) would not readily provide high performance either. For example, the existing circuit shown in FIG. 2 (discussed above) shows an existing two input gate, whose functions can be defined by appropriately writing the memory cells. In that circuit, by changing the memory content, the function can be changed accordingly. As discussed above, numerals A and B depict two inputs, which are used to access one of four memory cells for the right output. Implementing small functions like NAND or NOR using this technique, as in the case of FPGA, however, results in a slower operation and a higher power operation than the conventional logic gate, as well as a larger area. With reference to FIG. 3, this is because a two input NAND gate, for example, requires only four transistors in CMOS design, which is fast and which consumes less power.

Figure 4:
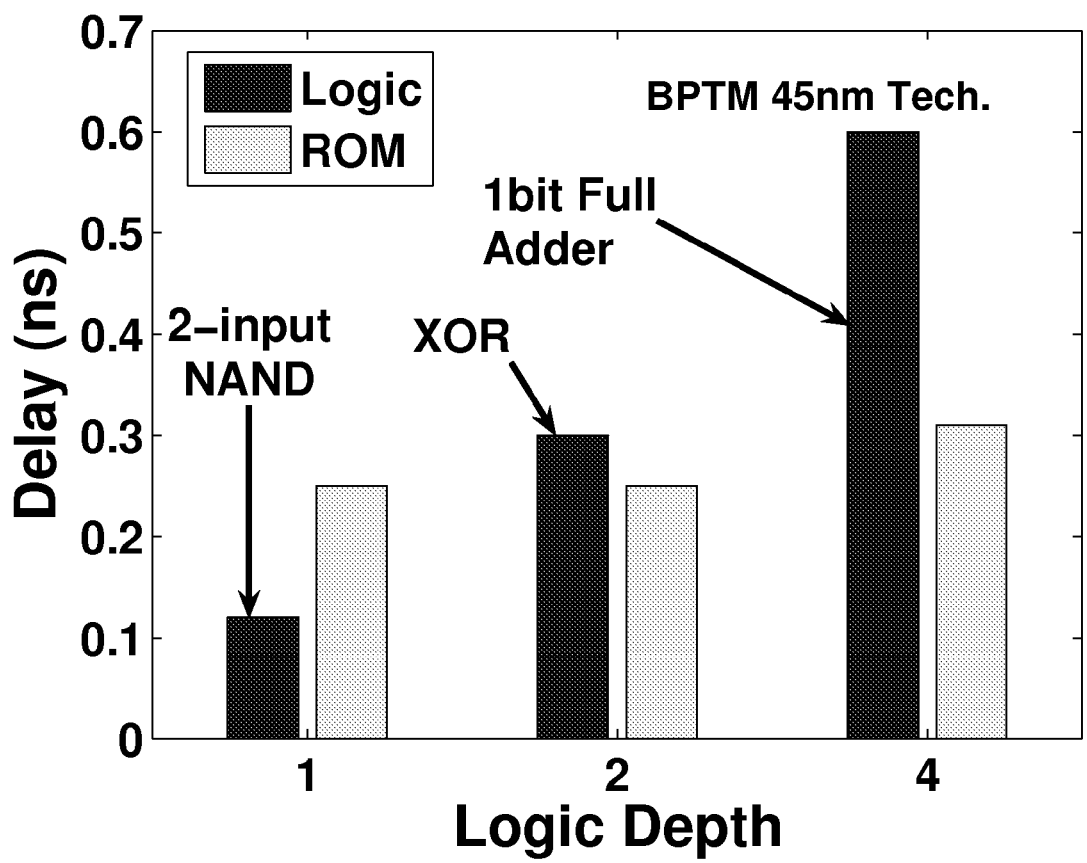
FIG. 4 is a graphical chart that compares delay verses logic depth between conventional (logic) applications and new (ROM) applications according to some embodiments of the invention.
Figure 5:
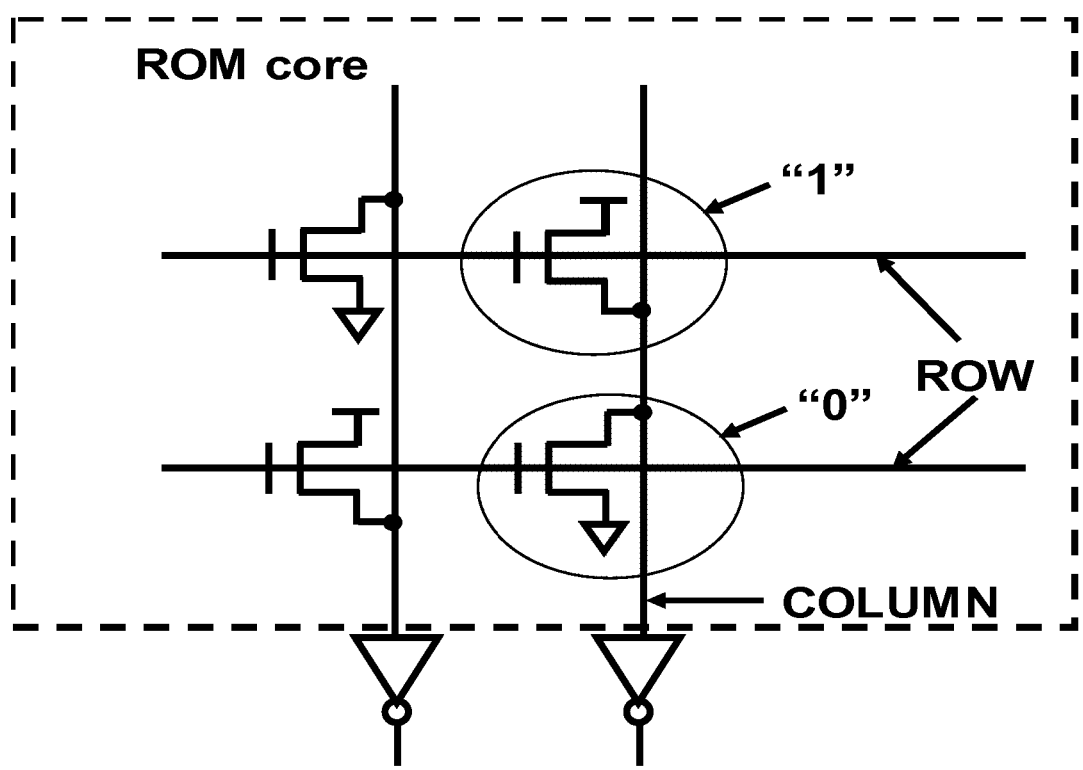
FIG. 5 is an architectural diagram depicting an illustrative and non-limiting ROM structure that is employed in some of the preferred embodiments.

Therefore, according to the preferred embodiments, the function size (e.g., mainly the logic depth) is to be large enough to fully exploit the advantage of ROM based design for high performance applications. For example, while a ROM based NAND (logic depth: 1) gate is slower than its CMOS counterpart, a 1 bit full adder (logic depth: 4) can be much faster than a conventional one. FIG. 4 graphically (?) illustrates this latter example, demonstrating that delay in the ROM based design is significantly longer at logic depth 1, but becomes significantly shorter at logic depth 4. Here, FIG. 5 depicts the ROM structure used in this exemplary analysis. In the example shown in FIG. 5, both '0' and '1' are implemented using NMOS transistor. While '0' can be read through NMOS connected between the bitline and ground, '1' on the other hand, is read through the NMOS pass transistor connected between $V_{dd}$ (e.g., the drain voltage) and the bitline. This is done to avoid short circuit current during read operation. An inverter is used at the end of the bitline to achieve full voltage swing. Once again, this is merely one exemplary and non-limiting structure of a ROM that can be employed to demonstrate techniques according to some illustrative embodiments of the invention. In other embodiments, other efficient ROM (e.g., speed efficient and/or area efficient ROMs) can be employed to further enhance the performance according to other embodiments.

As mentioned above, while implementing small basic gates using an MBC technique does not lead to high performance designs, using this technique to implement large circuit blocks in a straight forward manner also does not provide high performance designs. This is because, inter alia, with this technique the storage requirement increases exponentially with the number of inputs, thereby increasing both the delay and the power required. By way of example, to implement a 16×16 multiplier using an MBC technique, the memory requirement would be $2^{32} \times 32$ bit; all possible combinations of 32 inputs with 32 bit result for each input combination. Hence, a straight forward application of an MBC to achieve a high performance design is, in reality, not appropriate.

Accordingly, in the preferred embodiments, a design technique is employed that enables the utilization of MBC for achieving high performance and low power operations. In this design technique, a large circuit block is divided into optimum smaller blocks. Then, each of these blocks is implemented using an MBC technique.

Figure 6:
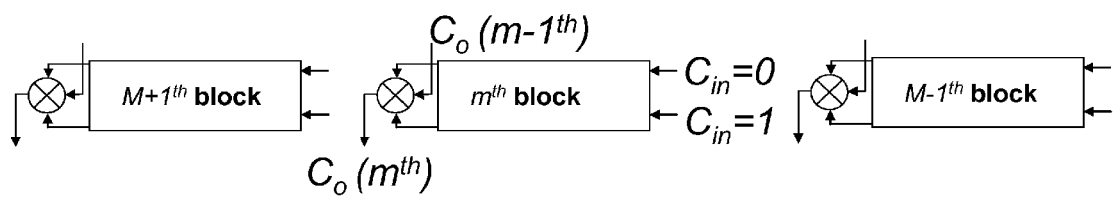
Figure 6:
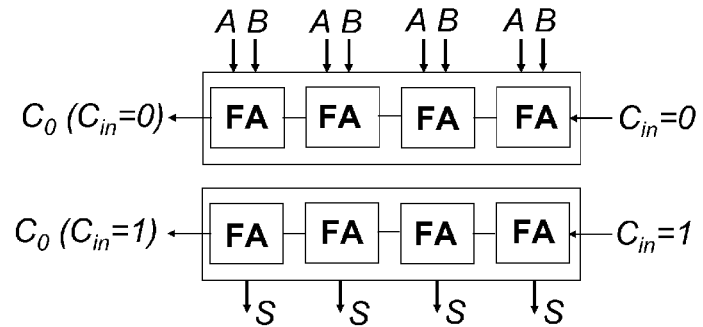
Figure 6:
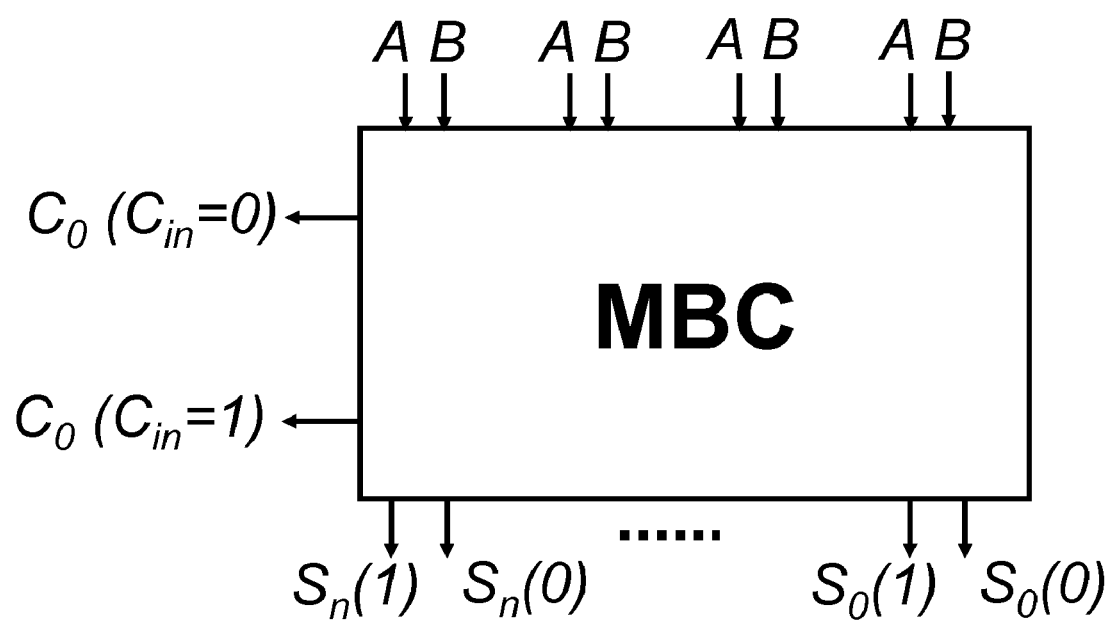

FIGS. 6(*a*)-6(*c*) demonstrate an illustrative and non-limiting example of employing such a design technique in the context of implementing a Carry Select Adder (CSA). This exemplary Carry Select Adder implementation is just an illustrative example. Virtually any large circuit can be efficiently implemented using this technique. In this regard: FIG. 6(*a*) depicts a block diagram of a Carry Select Adder; FIG. 6(*b*) depicts a conventional logic implementation of the Carry Select Adder shown in FIG. 6(*a*); and FIG. 6(*c*) shows the implementation of each block using an MBC technique.

Figure 7:
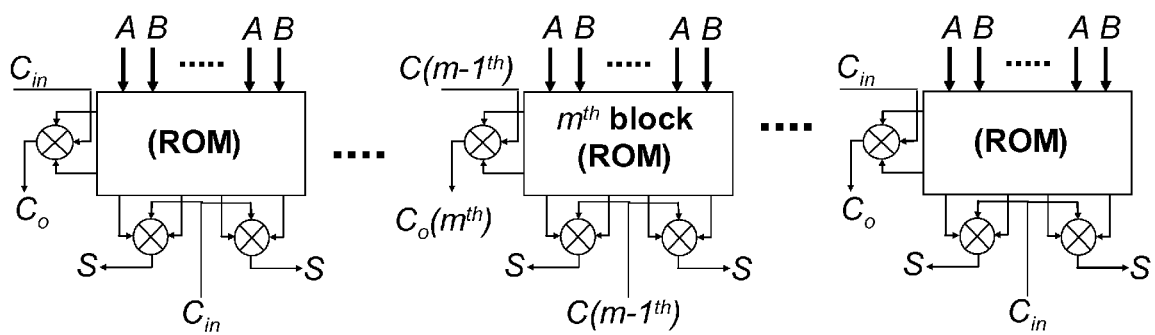
FIG. 7 shows a block diagram of the Carry Select Adder with MBC of FIGS. 6(a) to 6(c), in which the input bits are used as the address to access the memory in each block.
Figure 8:
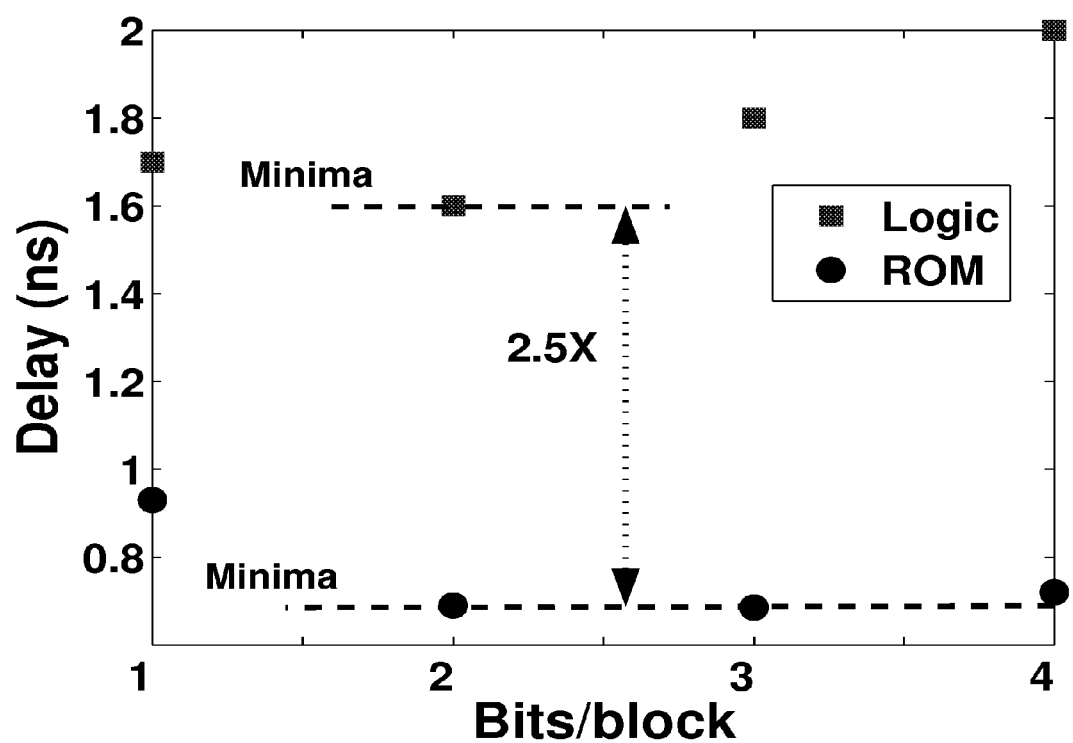
FIG. 8 shows an illustrative and non-limiting example of an optimization result in the case of a 16 bit Carry Select Adder.

FIG. 7 shows the block diagram of the Carry Select Adder with MBC of FIGS. 6(a) to 6(c), in which the input bits are used as the address to access the memory in each block. In the preferred embodiments, the size of the block can be optimized for minimum delay and for high performance design. In this regard, FIG. 8 shows an illustrative and non-limiting example of an optimization result in the case of a 16 bit Carry Select Adder. In this example, both conventional (i.e., designated as logic in FIG. 8) and MBC (i.e., designated as ROM in FIG. 8) implementations were done using Berkeley Predictive Technology Model (BPTM) 45 nm technology and the illustrative and non-limiting exemplary ROM cells shown in FIG. 5 were used in the MBC implementation. As shown in FIG. 8, in accordance with the foregoing description, neither the smallest block (e.g., 1 block in FIG. 8) nor the largest block (e.g., 4 in FIG. 8) with the ROM based design would provide the maximum performance. In the preferred embodiments, however, an optimum number of blocks should preferably be chosen so as to achieve a maximum or closer to a maximum performance. With reference to FIG. 8, it can be seen that in this illustrative example, by optimizing the block size, an MBC implementation can be approximately 2.5× faster than the conventional logic circuits.

Figure 9:
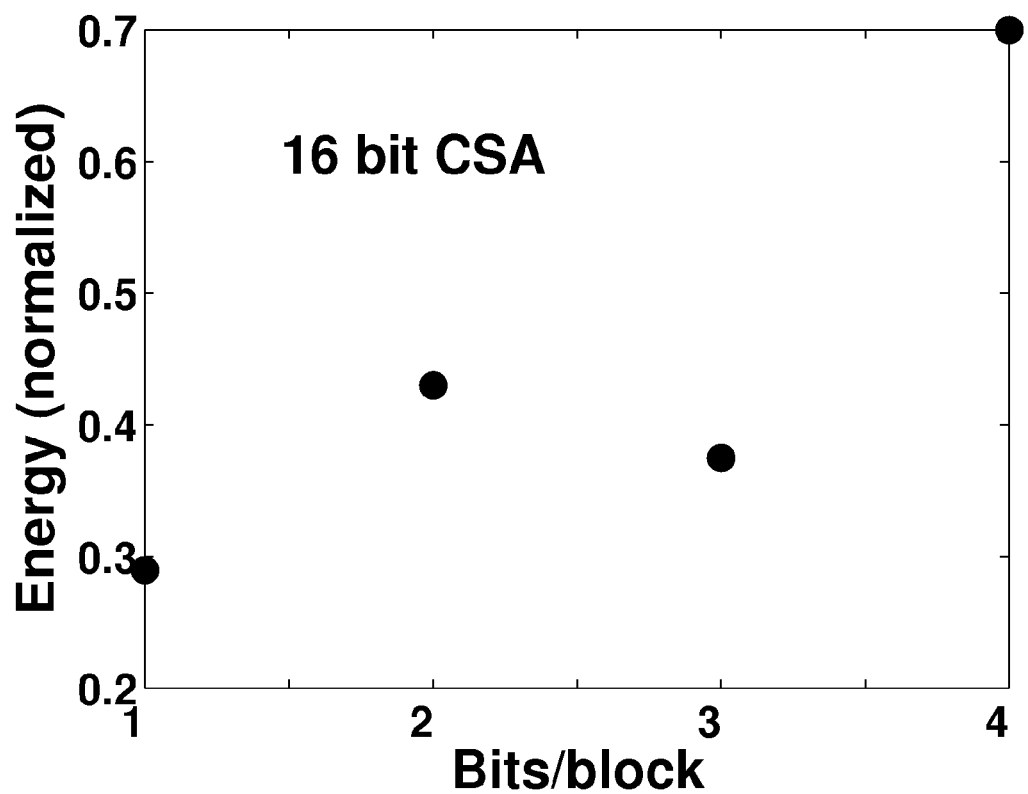
FIG. 9 is a graphical chart demonstrating energy savings (normalized) to different block configurations of the above CSA.
Figure 10:
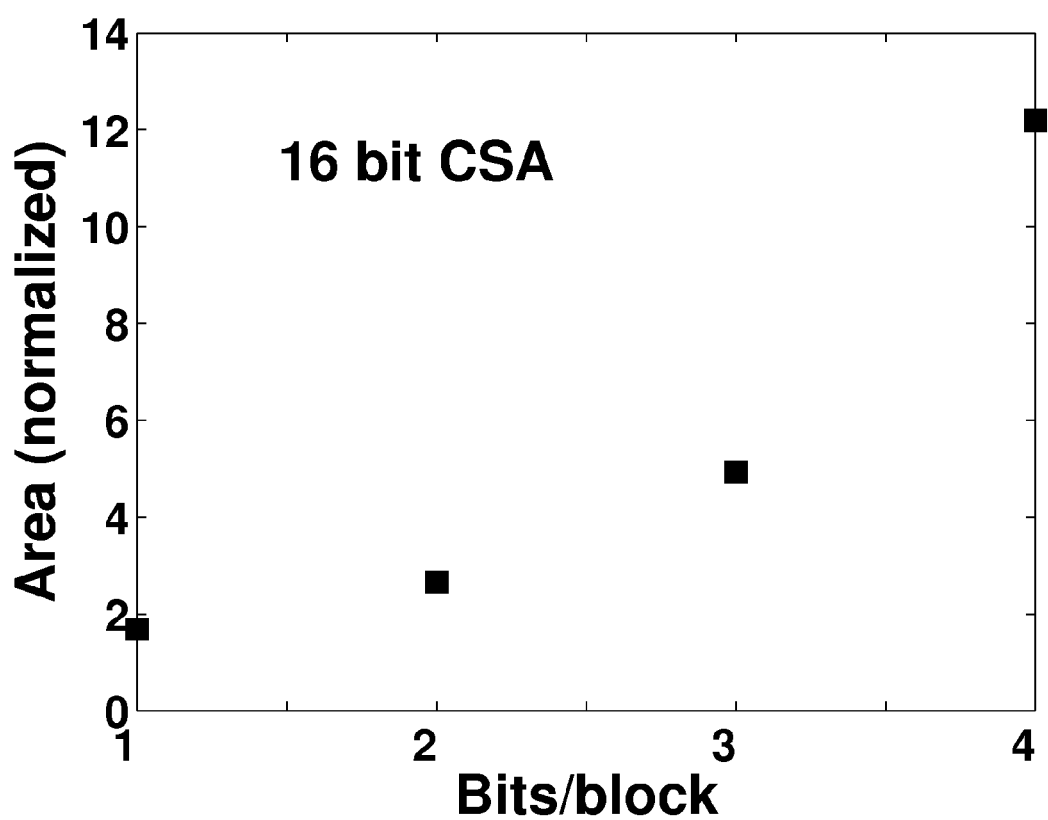
FIG. 10 is a graphical chart demonstrating the area overhead (normalized) to different block configurations of the above CSA.

FIGS. 9 and 10 show additional aspects related to the illustrative and non-limiting exemplary case of the 16 bit Carry Select Adder discussed above. In this regard, FIG. 9 shows the energy savings (normalized) to different block configurations of the above CSA, and FIG. 10 shows the area overhead (normalized) to different block configurations of the above CSA. In this regard, the normalized result means that the results are normalized to their Complementary Metal-Oxide Semiconductor (CMOS) counterpart. With reference to FIG. 9, the improvement in energy comes largely from a reduction in the number of switching. With reference to FIG. 10, although the area overhead would be significant in this particular illustrative example, it can be reduced significantly by employing, by way of example, sophisticated ROM and/or three dimensional (3D) architecture.

Figure 11:
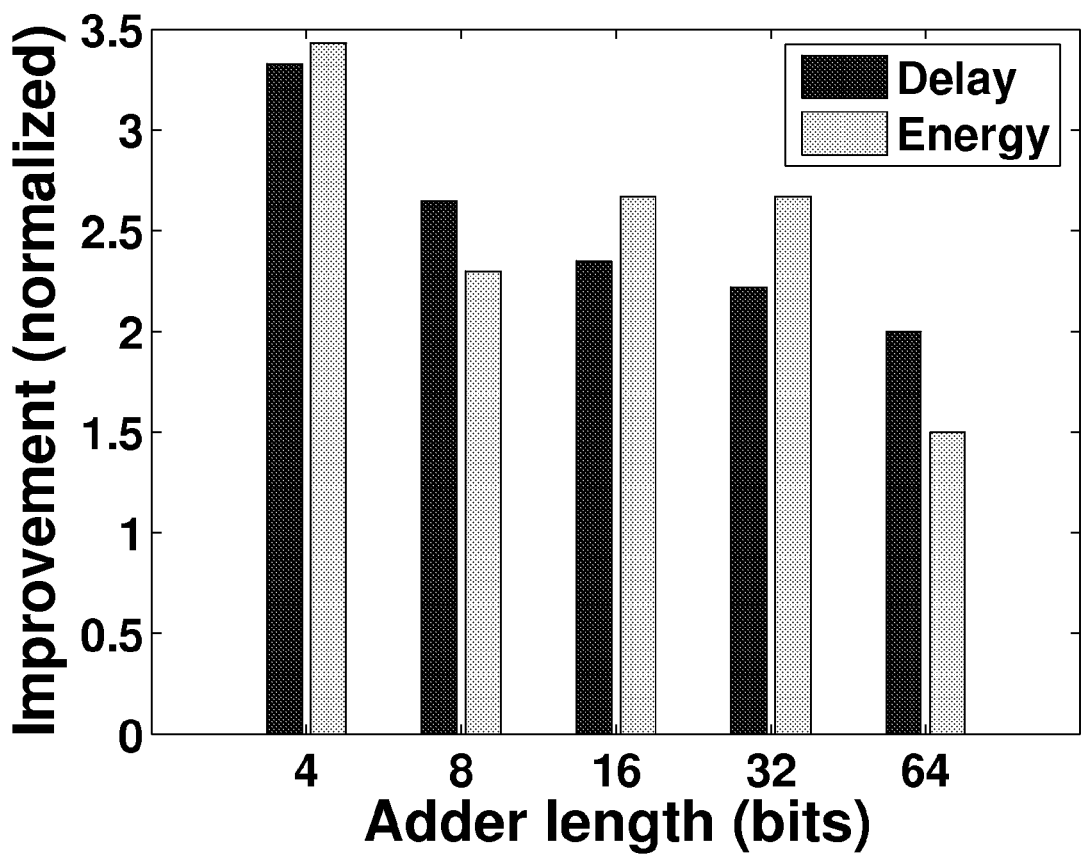
FIG. 11 is a graphical chart demonstrating improvements in delay and energy (normalized) in relation to adder length.
Figure 12:
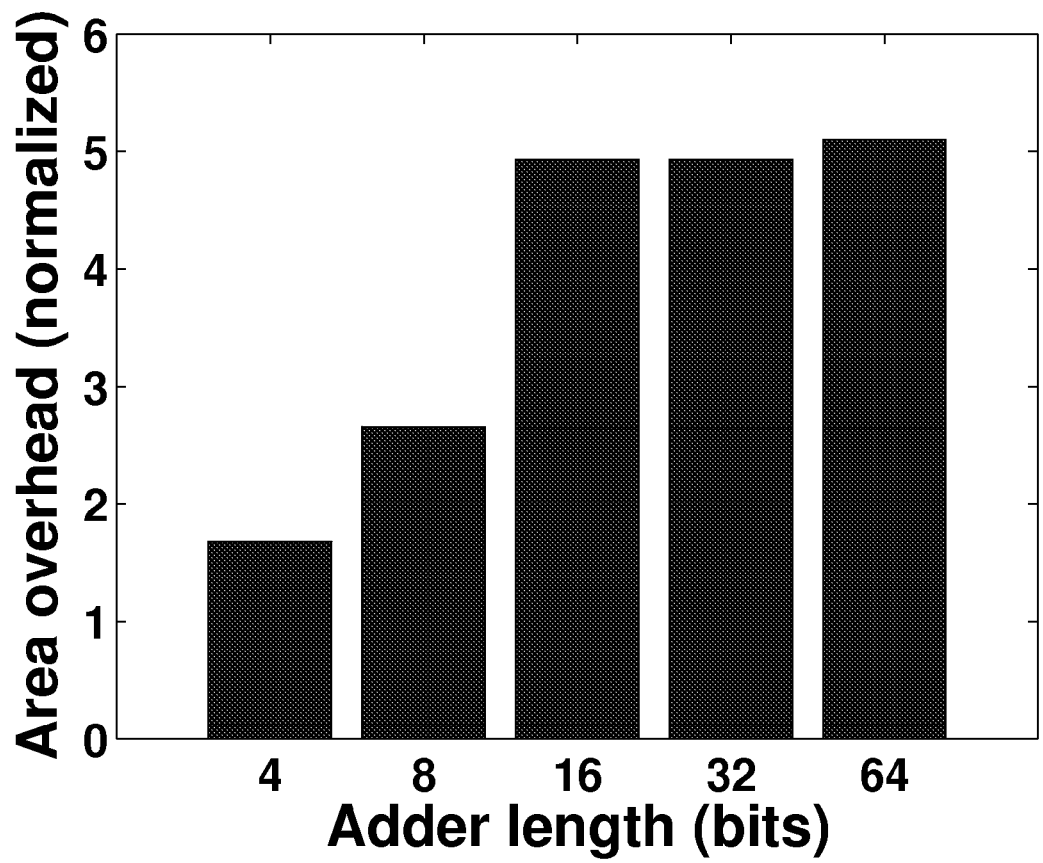
FIG. 12 is a graphical chart demonstrating improvement in area overhead (normalized) in relation to adder length.

FIGS. 11 and 12 show results of further analyses of different adder lengths, demonstrating similar improvements can be achieved. In this regard, FIG. 11 demonstrates improvements in delay and energy (again, normalized) in relation to adder length, and FIG. 12 demonstrates improvement in area overhead (again, normalized) in relation to adder length.

Figure 13A:
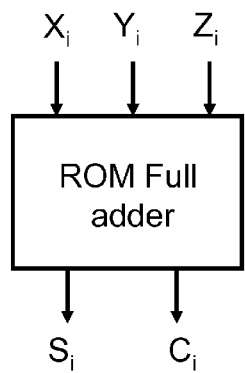
FIGS. 13(a) and 13(b) are illustrative diagrams showing schematics of an illustrative Carry Save Adder.
Figure 13:
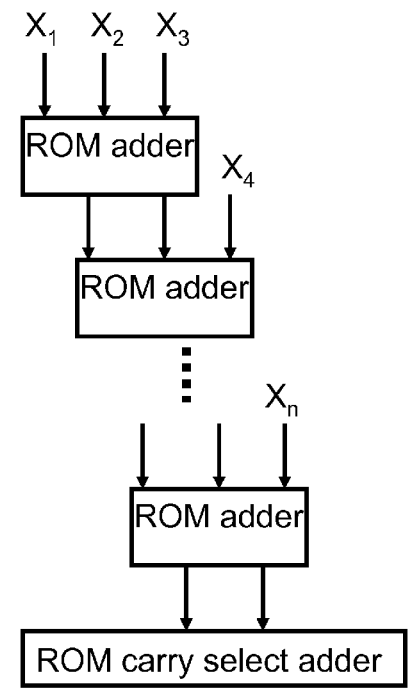

FIGS. 13(a) and 13(b) show schematics of an illustrative Carry Save Adder according to another illustrative and non-limiting example involving a 16 bit Carry Save Adder (e.g., to add 10 numbers). FIG. 13(a) shows the addition of ith bit of numbers X, Y and Z within a ROM full adder. On the other hand, FIG. 13(b) shows adding 'n' numbers through the Carry Save Adder. In this illustrative example, as shown, there is approximately a three times (3×) improvement in performance over static CMOS design. As with the foregoing example, an adder of different lengths and/or orders can also be implemented using this approach.

Figure 14:
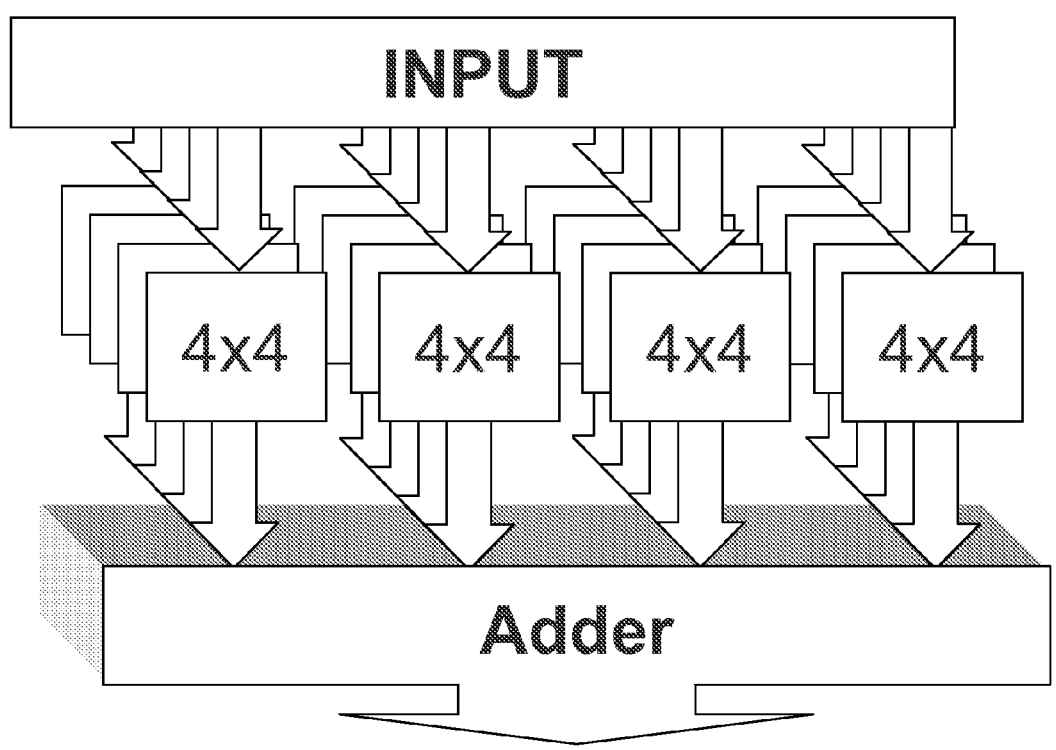
FIG. 14 is a diagram that shows an illustrative and non-limiting example of another circuit implementation, in the case of a 16×16 multiplier.

As should be understood by those in the art based on this disclosure, a similar approach can be employed to implement other circuits. In this regard, FIG. 14 shows one illustrative and non-limiting example of another circuit implementation, in the case of a 16×16 multiplier. In this additional illustrative implementation, sixteen 4×4 multipliers are implemented directly using an MBC technique. Then, the outputs are added using a Carry Save Adder of length 28 and order 5, which is implemented using the architecture proposed above. In this approach, a performance improvement of approximately 3× was achieved. Once again, this is merely one illustrative and non-limiting example implementing a multiplier using an MBC technique. In some preferred embodiments, the memory block size and the adder combination can further be optimized to, e.g., improve performance, to reduce power and/or to reduce area.

In the preferred embodiments, input bits are used as the address to read the result from the memory in MBC. In the preferred embodiments, an efficient decoder circuit and memory architecture should, thus, be employed to implement each block. In this regard, employing an efficient decoder not only enables faster operation, but also enables a reduction in power.

In some embodiments, non-silicon and/or other emerging non-volatile memory cells can be further employed as memory in some embodiments of the invention so as to further provide compact design while enabling faster and low power design. In the post-silicon era, while three terminal devices are revealing lower and lower prospects in competing with silicon transistors, two terminal devices, such as memory, however, should make a markable progress. In this context, the MBC technique can, very efficiently, utilize these advancements in memory technology, resulting in very high performance designs. By way of example, some illustrative emerging memories include non-silicon materials, inorganic materials, organic materials, single molecule materials, carbon nanotube memories, copper sulphide, phase change devices, cadmium sulphide and/or other emerging memories.

Furthermore, when a conventional pipeline architecture is employed along with MBC, the design will achieve an even more efficient result. Here, the MBC technique enables even more efficient pipelining in many applications, such as, e.g., in adder and multiplier applications, than experienced in conventional logic implementations. In this regard, in some embodiments, one can also use pipelining for resource management. For example, the same memory can be used to obtain results for different blocks in a CSA (see, e.g., the example shown above) by employing pipelining. This will reduce the area requirement by a significant amount.

Moreover, the MBC technique can also be efficiently used in three-dimensional (3D) circuit design. Among other things, implementing a memory element in a layer closer to a decoder and/or other control circuit blocks will provide efficient results.

Broad Scope of the Invention:

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example;" and "NB" which means "note well."

The invention claimed is:

1. A method for providing a logic circuit for high performance and low power operations, comprising:
   dividing a large circuit block of a digital function based on decoder complexity and ROM size into optimum smaller blocks;
   implementing each of said smaller blocks using a memory based computation (MBC) technique in which input bits are used as addresses to read results from memory.

2. The method of claim 1, further including using input bits as addresses to access the memory of respective ones of said smaller blocks.

3. The method of claim 1, further including optimizing the size of each of said smaller blocks so as to limit delay, to improve performance and/or to improve area requirements.

4. The method of claim 1, further including reducing area overhead through ROM and/or 3D architecture.

5. The method of claim 1, wherein said logic circuit relates to a multiplier, and further including selecting adder lengths to limit delay, improve performance and/or to improve area requirements.

6. The method of claim 1, further including providing a decoder circuit and memory architecture to implement each of said smaller blocks.

7. The method of claim 1, further including employing pipeline architecture with said MBC technique.

8. The method of claim 1, further including employing pipeline architecture for resource management.

9. The method of claim 8, further including using a same memory to obtain results for a plurality of different ones of said smaller blocks using pipelining.

10. The method of claim 1, further including employing said method in three-dimensional circuit design.

11. The method of claim 9, further including implementing said memory in a layer close to a decoder and other circuit blocks.

12. The method of claim 1, further including providing said memory from a non-silicon memory.

13. A method for optimizing a read-only memory (ROM)-based digital logic function implementation, the method comprising:
   dividing a large circuit block of a function into a plurality of smaller blocks based on decoder complexity and a size of a ROM; and
   implementing each of the plurality of smaller blocks using a memory based computation (MBC) technique such that a plurality of input bits are used as addresses to read the plurality of smaller blocks from a memory.

14. The method of claim 13, further comprising employing a pipeline architecture for the MBC technique.

15. The method of claim 14, further comprising employing the pipeline architecture for resource management of the function.

* * * * *